United States Patent Office 3,576,606
Patented Apr. 27, 1971

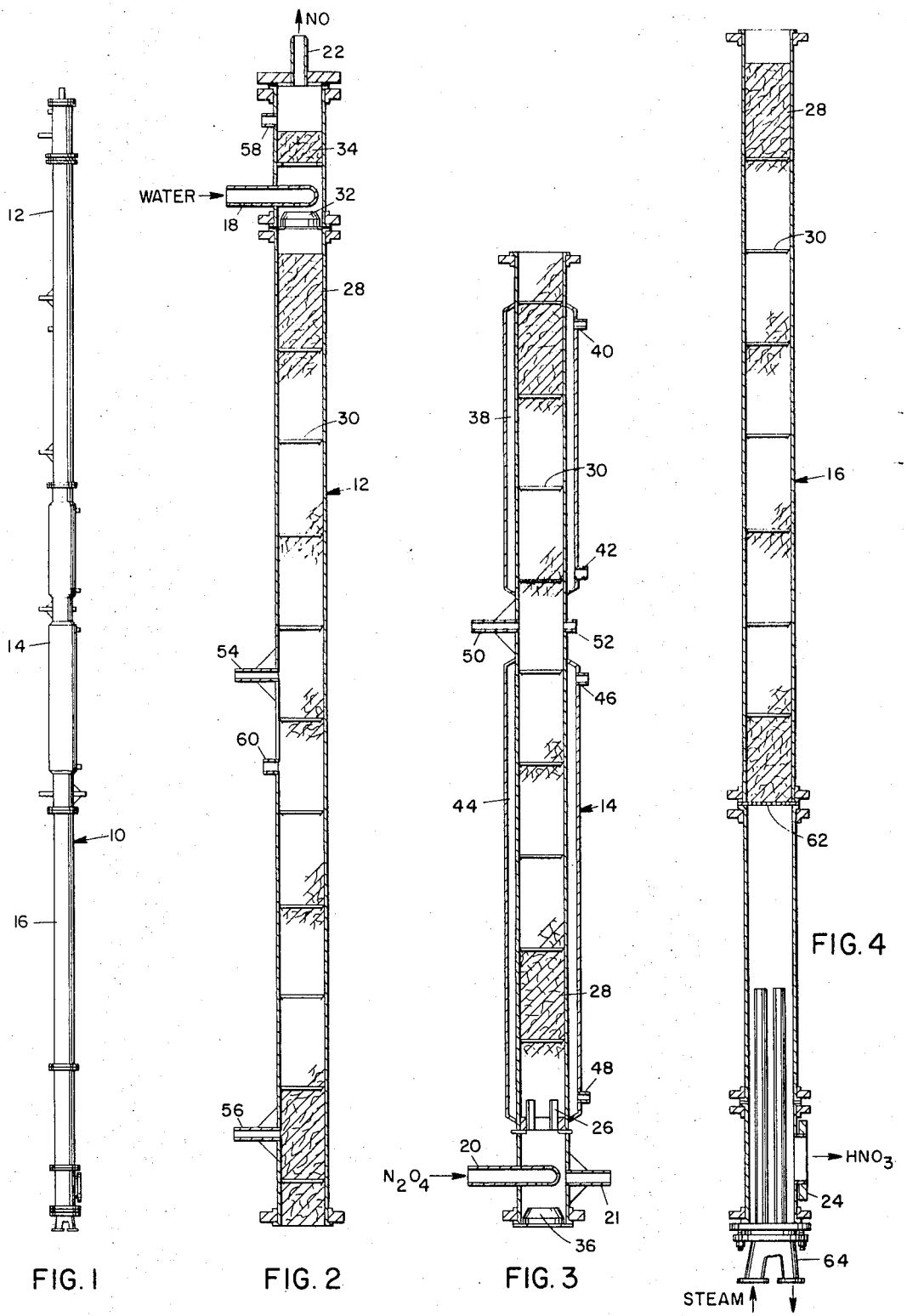

3,576,606
REACTOR FOR THE MANUFACTURE OF NITRIC OXIDE
Frank E. de Vry, Greenville, Del., assignor to Hercules Incorporated, Wilmington, Del.
Continuation-in-part of application Ser. No. 731,959, May 24, 1968. This application July 8, 1969, Ser. No. 839,821
Int. Cl. B01j 9/02; C01b 21/24
U.S. Cl. 23—283                 5 Claims

ABSTRACT OF THE DISCLOSURE

A reaction column for continuously converting nitrogen tetroxide into anhydrous nitric oxide of high purity with strong nitric acid as a co-product according to the equation $3NO_2+H_2O \rightarrow NO+2HNO_3$. The column is packed and even distribution of gas and liquid throughout its height is achieved by distributors and redistributors positioned within the packing in effective arrangement with the $NO_2$ and $H_2$ feed inlets. The $NO_2$ feed enters the column as liquid $N_2O_4$. The column further includes an entrainment separator located within the column and above the uppermost distributor and a heating means located within said column at the base thereof to strip $NO_2$ from the nitric acid co-product prior to its egress from the column.

---

This application is a continuation-in-part of my copending application Ser. No. 731,959 filed May 24, 1968.

This invention relates to the production of nitric oxide and more particularly to a reaction column which is designed to receive nitrogen tetroxide from suitable sources of supply such as by truck or tank car and to continuously convert the nitrogen tetroxide into anhydrous nitric oxide of high purity with strong nitric acid as a co-product.

A primary object of the present invention is to provide a compact reaction column to which nitrogen tetroxide is continuously fed either in liquid or vapor form and caused to react with a counter current flow of water, as such or in the form of weak nitric acid, to give a high purity nitric oxide in nearly quantitative yield with strong nitric acid as a co-product. Such a reaction column or converter fills a long felt need in the chemical industry by providing convenient on-the-site manufacture of a gas which is prohibitively costly to ship any appreciable distance in industrial quantities. It will be appreciated that nitric oxide is becoming increasingly important as a raw material for the manufacture of $N_2O_3$ and NOCl. Thus, the attainment of the foregoing object serves to considerably accelerate the importance of this product and open new avenues for its use by the chemical industry.

Other objects of the invention will appear hereinafter the novel features and combinations being set forth in the appended claims.

Generally stated, this invention, as commercially practiced, provides a compact reactor in the form of a packed column in which the following reaction takes place:

$$3NO_2+H_2O \rightarrow NO+2HNO_3$$

The $NO_2$ feed enters the reactors as liquid $N_2O_4$ at a point approximately one third of the total height as measured from the bottom of the column while liquid water is admitted near the top. The product nitric oxide leaves the reaction column directly from the top while the strong nitric acid produced leaves the reactor column from the bottom. The entire operation is carried out continuously in a reaction column having a packed height to diameter ratio of approximately 60:1.

More specifically, the present invention provides a reaction column which is designed to receive nitrogen tetroxide from suitable sources of supply and to continuously convert said nitrogen tetroxide into nitric oxide of high purity with strong nitric acid as a co-product, said reaction column comprising in combination an elongated packed column, a water inlet located near the top of the column, a first liquid distributor located within the column beneath the water inlet and in proximity thereto, an entrainment separator located within the column above the water inlet and in proximity thereto to effect removal of liquid from the overhead nitric oxide product, a nitrogen tetroxide inlet located about one third the distance from the base of the column, a plurality of liquid redistributors substantially equally spaced within the packing of the column between the first liquid distributor and the nitrogen tetroxide inlet, a second liquid distributor located within the column beneath the nitrogen tetroxide inlet and in proximity thereto, heating means located within the column at the base thereof to effect removal of nitrogen dioxide from the bottom co-product nitric acid, a plurality of liquid redistributors substantially equally spaced within the packing of the column between the second liquid distributor and the heating means, an outlet at the top of the column for passage of the nitric oxide and water vapor from said column, and an outlet at the bottom of the column for passage of the strong nitric acid and water vapor from said column.

The invention will be illustrated in greater detail with reference to the accompanying drawing wherein reference symbols refer to like parts wherever they occur. The description is an example of a reaction column used in commercial practice of the invention and wherein:

FIG. 1 is an elevational view of a completely assembled reaction column in accordance with the invention;

FIG. 2 is a sectional view of the top section of the reaction column;

FIG. 3 is a sectional view of the intermediate section of the reaction column; and FIG. 4 is a sectional view of the bottom section of the reaction column.

In the operation hereinafter to be described for the continuous conversion of nitrogen tetroxide ($N_2O_4$) into nitric oxide with strong nitric acid as a co-product, the following conditions and yields are typical:

$N_2O_4$ feed—138 lb./hr. at 70° F.
$H_2O$ feed—60 lb./hr. at 70° F.
Reactor pressure—50 p.s.i.g. at 280° F.
Cooling jacket—40 p.s.i.g. at 100° F.
Reaction column—304 stainless steel, 6" O.D., 5½" I.D. with top section 12'-10", intermediate section 10'-6", bottom section 12'-11", total length 36'-3".
NO product—30 lb./hr. of high purity containing not more than 200 p.p.m. of $NO_2$.
$HNO_3$ co-product—126 lb./per hr. (100% basis) acid strength of 75% and containing not more than about 0.1% $NO_2$.

Referring now to the drawing, an elongated packed column 10 comprises an upper section 12, a jacketed intermediate section 14 and a bottom section 16. A water inlet 18 is provided near the top of the upper section 12 and a $N_2O_4$ inlet 20 is provided near the bottom of the intermediate section 14. An NO outlet 22 is provided at the top of the upper section 12 and an $HNO_3$ outlet 24 is provided near the bottom of the bottom section 16.

A gas injection and support plate 26 is secured within the intermediate section 14 of the column 10 at a point about six inches above the $N_2O_4$ inlet 20. An upper liquid tap 21 is provided opposite the inlet 20. The plate 26 supports twenty feet of corrosion resistant packing represented by 28 of which the bottom one foot consists of one inch Intalox saddles with the remaining nineteen feet being one-fourth inch Intalox saddles. Liquid redistributors 30 of corrosion resistant "Rosette" type stoneware are interposed at approximately one foot intervals throughout the packing 28. A first liquid distributor 32 of "weir-riser" type stoneware is secured within the column 10 between the top of the packing 28 and the water inlet 18. A Demister 34 is provided within the column 10 between the water inlet 18 and the NO outlet 22 at the top of the column. The Demister serves as an entrainment separator to effect removal of liquid from the overhead nitric oxide product. A second liquid distributor 36 of "weir-riser" type stoneware is secured within the column 10 immediately beneath the $N_2O_4$ inlet 20.

The upper portion of the intermediate section 14 of the column 10 is provided with a cooling jacket 38 having a coolant inlet 42 and coolant outlet 40. The lower portion of the intermediate section 14 of the column 10 is likewise provided with a cooling jacket 44 having a coolant inlet 46 and coolant outlet 48. The total cooled surface of the column does not exceed one-third of its total height. A sampling conduit 50 and a thermowell 52 is provided between the cooling jackets 38 and 44. The exothermic reaction in the intermediate section 14 of the column 10 is sufficiently high for most geographic locations to warrant the cooling jackets but this is not necessary in all cases. Additional sampling conduits 54 and 56 are located at near the middle and at near the bottom respectively, of the upper section 12. Additional thermowells 58 and 60 are located at near the top and at near the middle, respectively, of the upper section 12.

The bottom section 16 has a perforated support plate 62 secured therein which supports eight feet of packing represented by 28 of which the bottom one foot consists of one inch Intalox saddles with the remaining seven feet being one-fourth inch Intalox saddles. Liquid redistributors 30 similar to those used in the upper portions of the column 10 are interposed at approximately one foot intervals throughout the packing 28. The support plate 62 is located about five feet from the bottom of the column 10 and a four tube bayonet heater 64 or bleacher extends into the bottom of the column and beyond the $HNO_3$ outlet 24. The bayonet heater serves as heating means to effect removal of nitrogen dioxide from the bottoms co-product nitric acid. With reference to the foregoing description, it will be appreciated that the column and all internal elements thereof are of corrosion resistant materials.

As an example of operation of the reaction column heretofore described the $NO_2$ feed enters the column as liquid $N_2O_4$ at a point approximately one third of the total height as measured from the base while liquid water is admitted near the top. The product nitric oxide leaves the reactor column directly from the top as overhead product while the nitric acid produced discharges from the base as bottom product. The entire operation is continuous.

As previously set forth, the column has a packed height to diameter ratio of approximately 60:1. Even distribution of gas and liquid throughout this height is achieved by the use of the rosette redistributors at one foot intervals in the packing. Liquid entrainment in the product gas is reduced by the use of the mesh Demister located near the top of the column. The Demister is constructed of knitted wire mesh and as the liquid-laden vapor passes therethrough small droplets of liquid having greater inertia, collect on the wire surface and grow in size till they run off and fall free. The nitric acid co-product is freed of dissolved nitrogen dioxide by heating it near its boiling point. This is carried out in the base section of the reactor column by means of the tantalum bayonet heater projecting upward into the base. The heat is provided by steam passed through the bayonets. Removal of the $NO_2$ from this nitric acid may also be facilitated by allowing a small quantity of nitric oxide product to sparge into the acid in the base section while it is being heated. This nitric oxide acts as a sweep gas to liberate the $NO_2$ and carry it upward into the intermediate section for reaction. A controller (not shown) holds the level of the nitric acid in the base. The bottom one third of the column is Teflon coated to reduce attack by the strong nitric acid formed.

The reaction column according to this invention can be operated at atmospheric pressure and also at as high a pressure as is consistent with reasonably complete removal of the dissolved $NO_2$ from the nitric acid co-product. The usual operating pressure range is atmospheric to 150 p.s.i.g. The strength of the nitric acid can be controlled by the ratio of water to $NO_2$ fed to the column and also by the operating pressure. The usual range of acid strength lies between 60% and 85% depending upon the feed ratio and operating pressure. The usual residual $NO_2$ content of the "bleached" nitric acid is 0.1% or less by weight. The product nitric oxide is of high purity being at least 99% assay with water content depending upon the operating pressure of the column and the temperature of the nitric oxide product gas. The $NO_2$ content of the nitric oxide is approximately 200 p.p.m. over the range of operating conditions described above. Auxiliary equipment (not shown) conventionally used with the column includes a co-product nitric acid cooler, a molecular sieve for the simultaneous removal of water vapor and $NO_2$ from the product nitric oxide and instrumentation to control the feed rates of water and $N_2O_4$ as well as the recycle stream of nitric oxide product when used as a sparge gas for the nitric acid.

What I claim and desire to protect by Letters Patent is:

1. A reaction column for receiving nitrogen tetroxide from a suitable source of supply and continuously converting said nitrogen tetroxide into nitric oxide of high purity with strong nitric acid as a co-product, comprising in combination:
    (a) an elongated packed column, said column being packed with a chemically-inert packing material,
    (b) a water inlet located near the top of the column,
    (c) a first liquid distributor located within the column beneath the water inlet and in proximity thereto,
    (d) an entrainment separator located within the column above the water inlet and in proximity thereto to effect removal of liquid from the overhead nitric oxide product,
    (e) a nitrogen tetroxide inlet located about one third the distance from the base of the column,
    (f) a plurality of liquid redistributors substantially equally spaced within the packing of the column between the first liquid distributor and the nitrogen tetroxide inlet,
    (g) a second liquid distributor located within the column beneath the nitrogen tetroxide inlet and in proximity thereto,
    (h) heating means located within the column at the base thereof to effect removal of nitrogen dioxide from the bottoms co-product nitric acid,
    (i) a plurality of liquid redistributors substantially equally spaced within the packing of the column between the second liquid distributor and the heating means,
    (j) an outlet at the top of the column for passage of the nitric oxide and water vapor from said column, and
    (k) an outlet at the bottom of the column for passage of the strong nitric acid from said column.

2. The reaction column according to claim 1 in which:
    (a) the column and all internal elements thereof are of corrosion resistant materials.

3. The reaction column according to claim 1 in which:
    (a) the elongated packed column is packed with corrosion resistant saddles, and
    (b) the distributors and redistributors disposed above and disposed within said packing, respectively, are of corrosion resistant material.

4. The reaction column according to claim 1 in which:
    (a) a cooling jacket surrounds that portion of the reaction column extending above the nitrogen tetroxide inlet for a distance not exceeding about one-third of the total height of the column.

5. The reaction column according to claim 1 in which:
(a) the column has a packed height to diameter ratio of approximately 60:1.

References Cited

UNITED STATES PATENTS

| | | | |
|---|---|---|---|
| 2,098,953 | 11/1937 | Christensen | 23—160 |
| 2,585,638 | 2/1952 | Drew | 23—283 |
| 2,716,587 | 8/1955 | Hillard | 23—284X |
| 2,797,151 | 6/1957 | Schnur et al. | 23—283 |
| 3,063,804 | 11/1962 | Morrow | 23—162 |
| 3,099,697 | 7/1963 | Lerman et al. | 261—97 |
| 3,316,064 | 4/1967 | Kuzvoka et al. | 23—283 |
| 3,330,741 | 7/1967 | Theilig et al. | 261—97UX |
| 3,366,457 | 1/1968 | Hunter | 23—283X |
| 3,466,151 | 9/1969 | Sicard et al. | 23—283X |
| 3,523,762 | 8/1970 | Broughton | 23—204X |

FOREIGN PATENTS

| | | | |
|---|---|---|---|
| 817,720 | 10/1951 | Germany | 23—284 |
| 864,431 | 1/1953 | Germany | 23—283 |
| 929,030 | 6/1963 | Great Britain | 261—97 |

MORRIS O. WOLK, Primary Examiner

B. S. RICHMAN, Assistant Examiner

U.S. Cl. X.R.

23—157, 159, 284, 285; 261—97